United States Patent [19]
Thompson et al.

[11] 3,895,724
[45] July 22, 1975

[54] GRAVITY TYPE DRUM RACK WITH AN UNLOADING MECHANISM

[76] Inventors: Homer T. Thompson, 1821 Muse, Fort Worth, Tex. 76112; Herschel D. Terrell, Jr., 3928 Wosley, Fort Worth, Tex. 76133

[22] Filed: Mar. 4, 1974

[21] Appl. No.: 447,945

[52] U.S. Cl. ........ 214/16.4 R; 214/1 PB; 214/8.5 K; 221/22; 214/95 R; 211/134
[51] Int. Cl. .............................................. B65g 1/06
[58] Field of Search ........ 214/16.4 R, 1 PB, 16.4 C, 214/8.5 R, 8.5 K, 16.4 A, 95; 211/134, 162; 221/22, 21, 112, 123–124, 208, 289–290

[56] References Cited
UNITED STATES PATENTS

| | | | |
|---|---|---|---|
| 2,755,950 | 7/1956 | Forshey | 214/16.4 C |
| 3,601,270 | 8/1971 | Martin | 214/95 |
| 3,674,159 | 7/1972 | Lemelson | 214/16.4 A |
| 3,800,980 | 4/1974 | Takeuchi et al. | 214/8.5 K X |
| 3,805,974 | 4/1974 | Andersson et al. | 214/16.4 A |
| 3,837,511 | 9/1974 | Howlett | 214/16.4 C |

FOREIGN PATENTS OR APPLICATIONS

| | | | |
|---|---|---|---|
| 909,639 | 5/1946 | France | 221/123 |

*Primary Examiner*—Robert J. Spar
*Assistant Examiner*—R. B. Johnson

[57] ABSTRACT

The specification discloses a gravity feed drum rack comprising a plurality of pairs of spaced rails, each pair of rails of which is located at a different level and inclined downward toward an unloading end for supporting and storing a plurality of cylindrical drums on their sides and for allowing the drums to roll on the rails. A plurality of spacers are coupled along the length of each rail forming a plurality of pairs of spacers for each pair of rails for holding the drums spaced from each other and for allowing the drums sequentially and separately to roll forward on the rails toward the unloading end when the first drum of each pair of rails next to the unloading end is removed. A carriage adapted to move upward and downward in a chute next to the unloading end of the rack is employed to sequentially unload the drums from the rails. A weight tied to the carriage by way of a cable arrangement is employed to move the carriage upward to the different levels of rails. The weight of a drum when loaded on the carriage is sufficient to allow the carriage to be lowered to the ground for feedout purposes.

3 Claims, 10 Drawing Figures

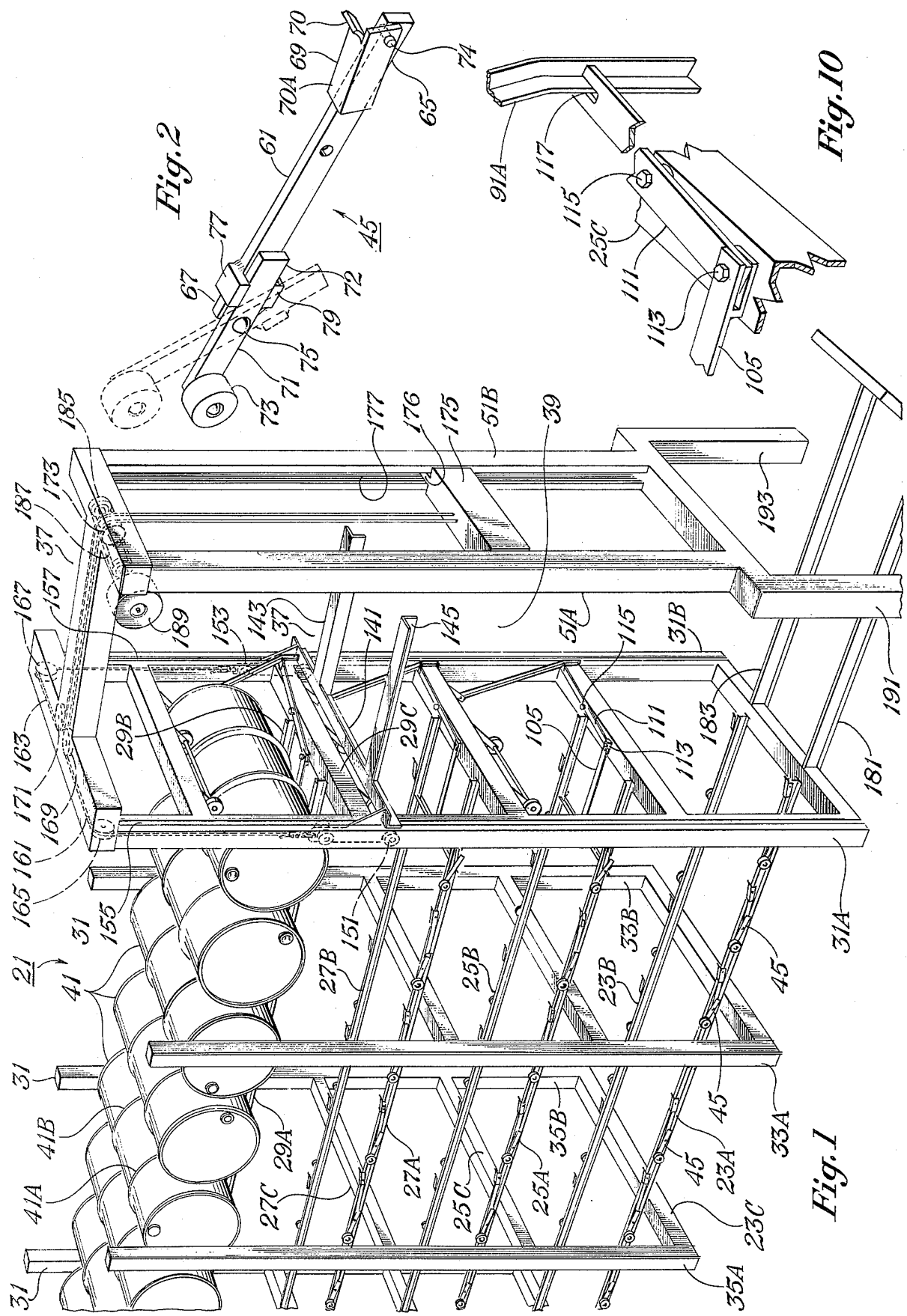

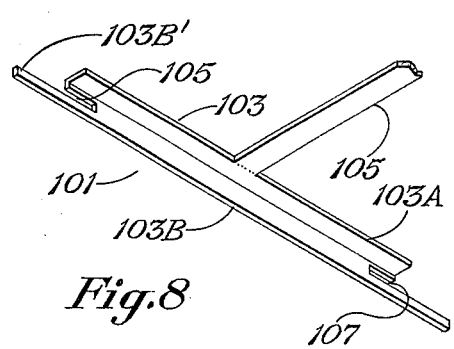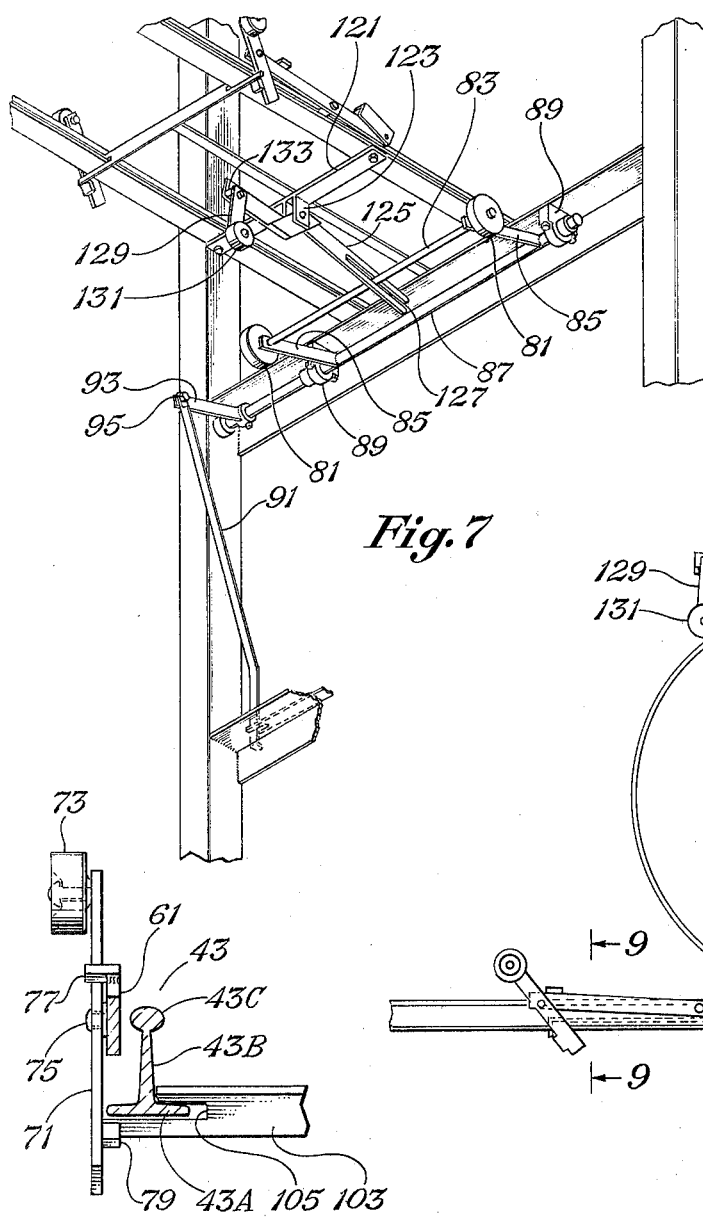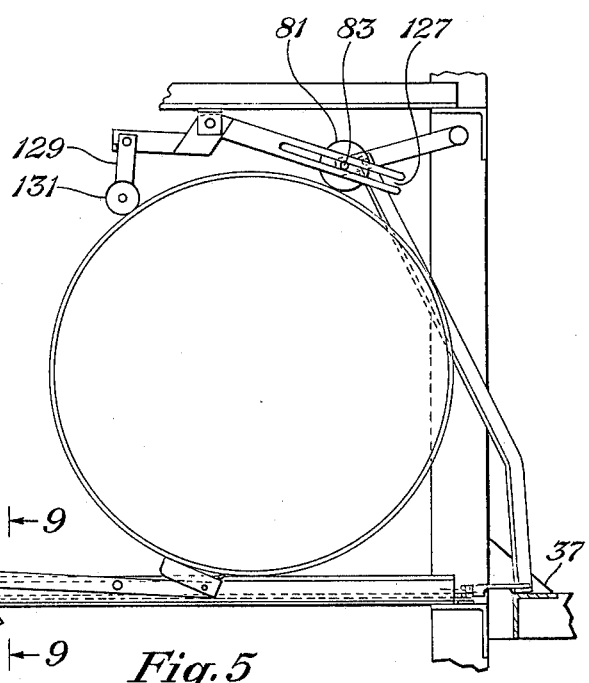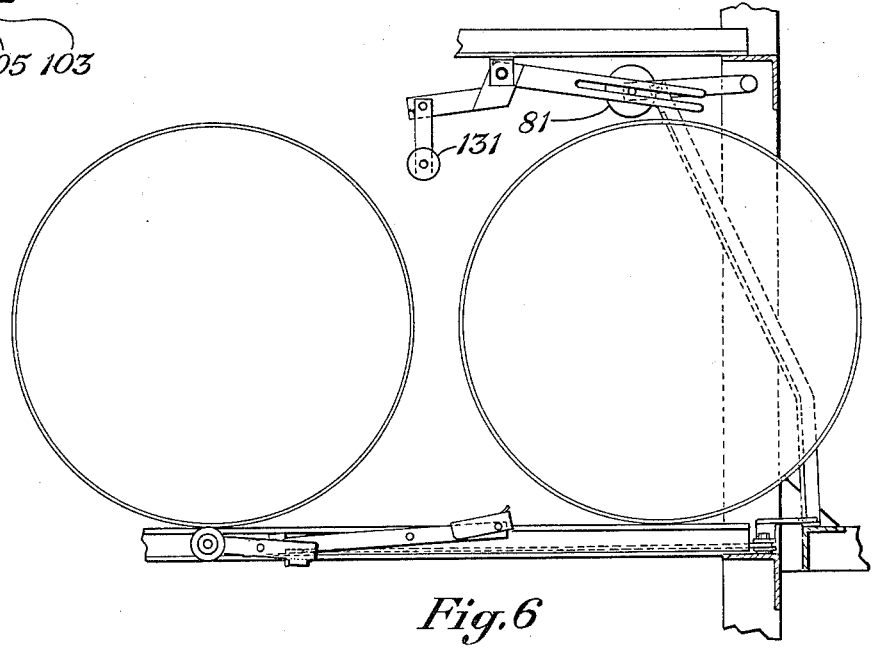

GRAVITY TYPE DRUM RACK WITH AN UNLOADING MECHANISM

BACKGROUND OF THE INVENTION

This invention relates to the gravity feed drum rack for storing and removing drums therefrom.

A need has existed for a simple, effective, and inexpensive rack for storing and removing cylindrical drums. Gravity feed racks employing inclined rails for storing the drums on their sides have been proposed or built, however, those known have experienced difficulties and problems. For example, these prior racks allow the drums to engage each other, along the length of their inclined rails. As the first drum at the low end of the rails is removed, the other drums are allowed to roll downward to fill the space of the first drum removed. The drums, however, all tend to rotate downward together and since they engage each other, frictional forces in opposite directions occur between any two drums at their point of engagement. The frictional forces between the drums tend to retard movement of the drums even though the rails are inclined.

SUMMARY OF THE PRESENT INVENTION

It is the object of the present invention to provide a simple, effective, and inexpensive gravity feed rack for storing and removing drums and which avoids the problems heretofore encountered.

The drum rack comprises a pair of spaced rails inclined downward toward an unloading end for supporting and storing a plurality of cylindrical drums on their sides and for allowing the drums to roll on their rails. In addition, there is provided a plurality of spaced spacer means coupled along the length of each rail forming a plurality of pairs of spacer means for holding the drums spaced from each other and for allowing the drums sequentially and separately to roll forward on the rails toward the unloading end when the first drum on the rails next to the unloading end is removed.

Each spacer means is pivotally coupled to a side of a rail for pivotal movement about a pivot axis between a holding position and a release position. Each spacer means has a first end located forward of its pivot axis closer to the unloading end of the rack and a second located rearward of its pivot axis. In the release position, each spacer means is adapted to have its first end located above the top of the rail and its second end at a position to allow a drum to roll over its second end to engage and move its first end downward to locate the spacer means in its holding position. In the holding position, each spacer means has its second end in the path of the next drum for spacing the next drum from the drum above its first end.

In the embodiment disclosed, each spacer means comprises an elongated spacer arm pivotally connected to the rail. A kicker arm is pivotally connected to the first end of the spacer arm while a stop arm employing a roller is pivotally connected to the second end of the spacer arm. In the release position, the stop arm will be located out of the path of the drum, while the kicker arm will be above the rail for engagement with a drum as it rolls forward to allow the drum to move the first end of the spacer arm downward and its second end upward to locate the spacer arm in a holding position. In this position, the stop arm will pivot to a position to locate its roller above the rail to stop and hold the next drum, away from the drum located above the kicker arm. In addition, in the holding position, the kicker arm urges forward the drum located above the kicker arm.

In a further aspect, the drum feed rack comprises a plurality of pairs of spaced rails, each pair of rails of which is located at a different level and inclined downward toward an unloading end for supporting a plurality of cylindrical drums on their sides and for allowing the drums to roll on the rails. A plurality of spacer means are coupled along the length of each rail forming a plurality of pairs of spacer means for each pair of rails for holding the drum spaced from each other and for allowing the drums sequentially and separately to roll forward on the rails toward the unloading end when the first drum on each pair of rails next to the unloading end is removed. A carriage is employed for unloading the drums from the rails and which is adapted to move vertically from a feedout position upward and downward next to the unloading end of the rack whereby the carriage may be located next to each of the upper rails for removing the drums therefrom. Cable means or the like is connected to the carriage and extends over reel means to a weight means having a weight greater than that of the carriage such that the weight means will pull the carriage upward when a drum is not located thereon. The combined weight of the carriage and a drum when located on the carriage is greater than that of the weight means whereby the carriage, when carrying a drum, will be lowered downward to its feedout position.

In addition, there is provided a movable stop means for each of the upper rails. Each movable stop means is located at the unloading end of the rack for holding the first drum of its rails next to the unloading end and for releasing the first drum to allow it to roll off of the rails. A movable engaging means also is provided for each of the upper rails. Each engaging means is coupled to its associated movable stop means and is adapted to extend in the path of travel of the carriage as it moves upward, when a drum is on its associated rails next to the unloading end of the rack. Each engaging means is adapted to be located out of the path of travel of the carriage when its associated rails have no drum located next to the unloading end of the rack. In addition, each engaging means is adapted to release its stop means and to stop the upward travel of the carriage when it extends in the path of travel of the carriage and is engaged by the carriage as it moves upward to release the first drum on its associated rails to allow it to roll onto the carriage for transportation down to the feedout position.

BRIEF DESCRIPTION OF THE DRAWINGS

FIG. 1 is a perspective view of the gravity feed rack of the present invention illustrating a number of levels of rails with drum spacers coupled thereto and an unloading carriage located in a chute at the unloading end;

FIG. 2 is an enlarged perspective view of one of the spacers of the rack of FIG. 1;

In FIG. 4, the drums are illustrated as spaced apart by spacers and the drum next to the unloading end held by a stop assembly which may be released by an engaging assembly when engaged by the carriage;

FIG. 5 and 6 illustrate the carriage engaging the engaging assembly for releasing the stop means for allowing the drum next to the unloading end to roll onto the carriage;

FIG. 7 is a perspective underside view of a stop assembly and an engaging assembly and an upper cocking assembly for moving its engaging assembly in the path of travel of the carriage when a drum is located at the unloading end of its rails;

FIG. 8 is an enlarged view of a portion of the cocking assembly of FIG. 7;

FIG. 9 is a cross-sectional view of FIG. 5 taken through the lines 9—9 thereof and illustrating a portion of the cocking assembly and a drum spacer; and FIG. 10 is an enlarged view of a portion of the engaging assembly and a portion of the cocking assembly;

DETAILED DESCRIPTION OF THE INVENTION

Figure 3:
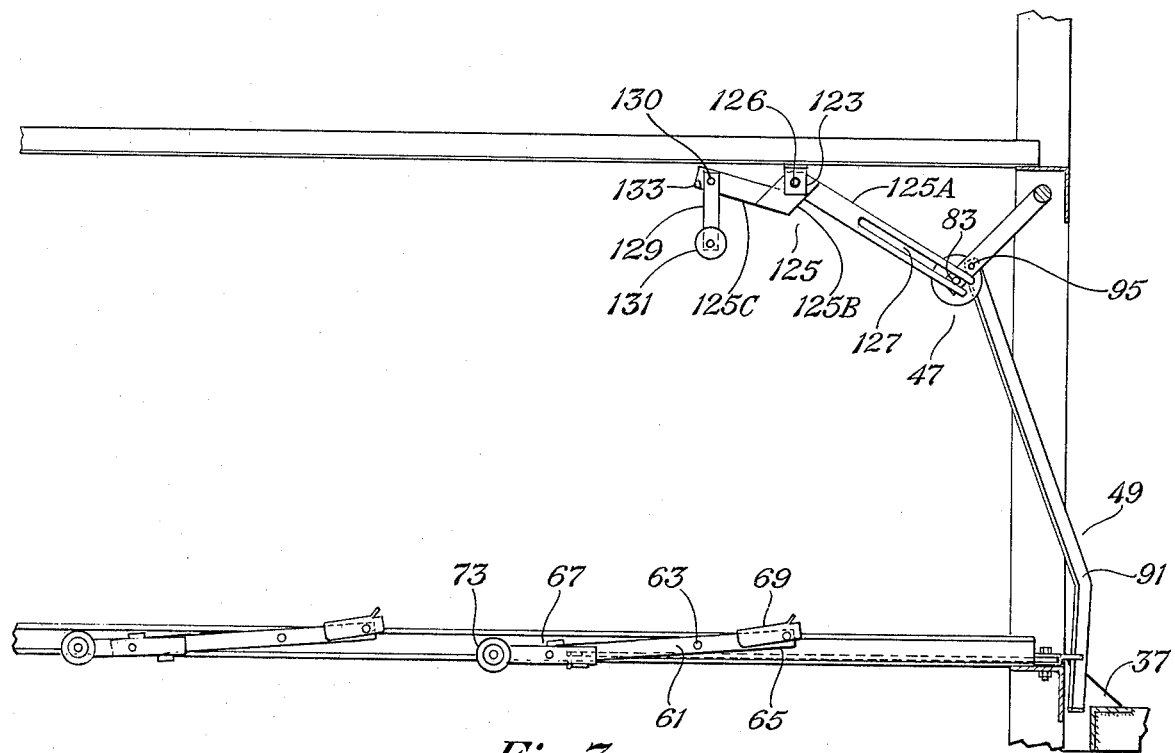
FIG. 3 is a side view of one of the levels of the rails of the rack with no drums located thereon. In this figure, spacers are not shown on the uppermost rails for purposes of clarity.

Referring now to FIG. 1, the gravity feed rack of the present invention is identified by reference numeral 21 and comprises a plurality of pairs of inclined rails supported at different levels. The plurality of pairs of rails are identified as 23a, 23b; 25a, 25b; 27a, 27b; and 29a, 29b. The rails are supported at different levels by cross bars which are connected to and supported by pairs of vertical posts. The cross bars at each level are identified at 23c, 25c, 27c, and 29c while the pairs of vertical posts are identified at 31a, 31b; 33a, 33b; 35a, 35b; etc. The rails of each pair are inclined downward toward an unloading end of the rack shown on the right in FIG. 1 where a carriage 37 is located for vertical movement in a chute 39. The rails of each pair are spaced apart such that they may support a plurality of drums on their sides to allow the drums to roll from the rear or loading end of the rack shown on the left in Fig. toward the unloading end and hence toward the chute 39. In one embodiment, the rack of the present invention is constructed to support and store empty conventional 55 gallon steel drums having a diameter of about 23½ inches and a length of about 35 inches. It may handle tight head drums or full rounded head drums. A plurality of drums 41 are shown stored on the upper pair of rails 29a and 29b. A cross section of one of the rails is illustrated in FIG. 9. The rail shown in this figure is identified at 43 and comprises a base 43a from which extends a vertical rail portion 43b having a rounded top 43c for supporting the drums. The rails of each pair are spaced apart an amount such that they will support the drums 41 on the outside of their roll hoops 41a and 41b. In one embodiment, the slope or incline of the rails toward the unloading end may be 1 inch per 4 feet of rail.

All of the rails have a plurality of pairs of spacers 45 coupled thereto along their lengths for separating the drums when stored on the rails and for sequentially and separately allowing the drums to move forward toward the unloading end when the first drum next to the unloading end of a given pair of rails is removed. At the unloading end of the rack, the carriage 37 is supported to move vertically upward and downward in the chute 39 defined by posts 31a and 33b and in addition, by posts 51a and 51b for sequentially removing the drums from the upper levels of rails 25a, 25b; 27a, 27b; and 29a, and 29b.

Figure 4:
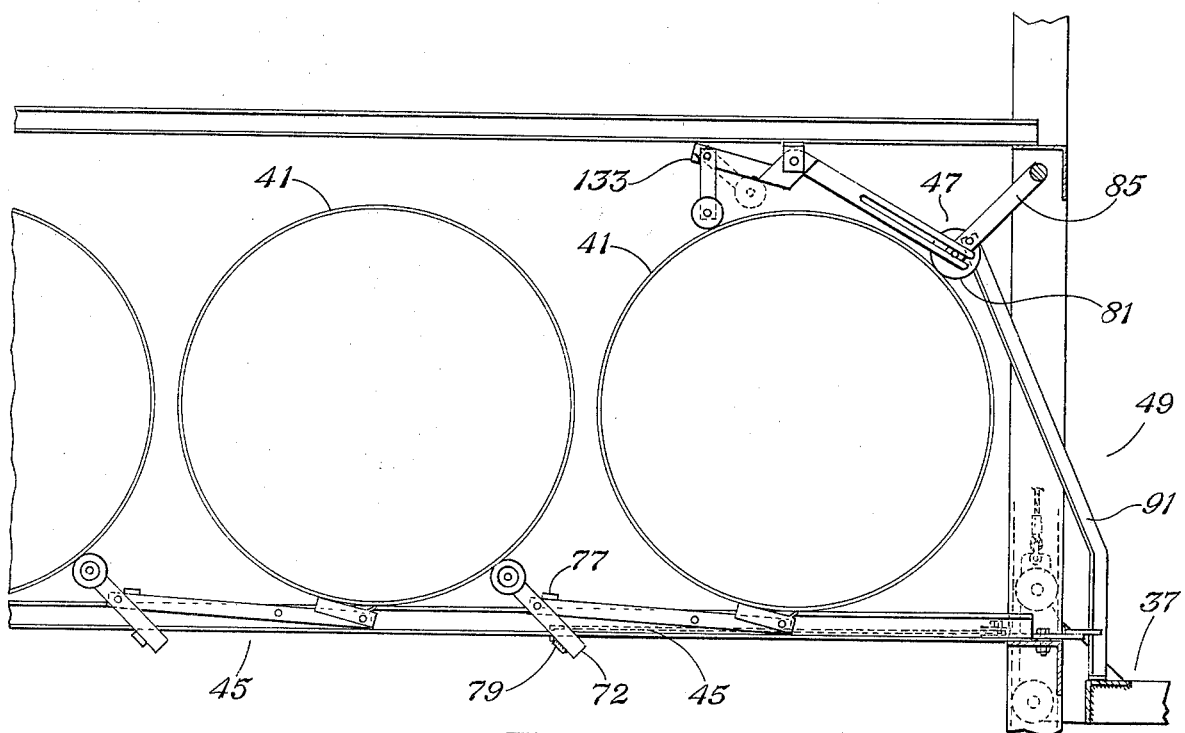
FIG. 4 is a side view of the rails of FIG. 3 of the rack with drums located thereon and ready to be removed by the carriage.

In operation, the different levels of rails will be loaded with drums from the loading end (the left end as shown in FIG. 1) and the drums will roll forward toward the unloading end where the first drum for a given upper level of rails will be stopped by a stop assembly identified at 47 in FIGS. 3 and 4. When this level of rails is full, the drums will be spaced apart by the spacers 45 as illustrated in FIG. 4. The stop assembly 47 is a given level of rails is released by an engaging assembly 49 when engaged by the carriage 37 as it moves upward. Upon release to the stop assembly 47, the first drum on the rails will roll onto the carriage which then will move downward for feedout of its drum. The next drum on the rails will move forward and will be held by the stop assembly 47 until the carriage returns upward and releases the stop assembly and hence the next drum.

Referring to FIGS. 2–6 and to FIG. 9, each spacer 45 comprises a spacer arm 61 pivotally coupled to the outside of its rail by way of a pivot connection 63 for pivotal movement about the axis defined by the connection 63. Each arm has a first end 65 located forward of its pivot axis, toward the unloading end of the rack, and a second end 67 located rearward of its pivot axis. Pivotally connected to the first end 65 of the spacer arm 61 is a kicker arm 69 having an upward extending tab 70 formed on its forward end. A stop arm 71 is pivotally connected to the second end 67 of the kicker arm 61 and a roller 73 is rotatably coupled to the rear end of the stop arm. Pin 74 pivotally connects kicker arm 69 to the first end of the spacer arm 61 while pin 75 pivotally connects the stop arm 71 to the second end 67 of the spacer arm 61. As illustrated in FIG. 3, pivotal connection 63 is located closer to the first end 65 of the spacer arm 61 than to its second end whereby the weight at its second end 67 will normally hold the second end downward to position the roller 73 out of the path of a drum and to locate the first end 65 and hence the kicker arm 69 upward and in the path of a drum as it rolls forward. The position of the spacer arm in FIG. 3 is defined as its release position and it will assume this position when a drum is not contacting or engaging the kicker arm 69. As a drum rolls forward towards the kicker arm 69, it will engage the kicker arm and force the kicker arm and hence the first end 65 of the spacer arm downward thereby causing its second end 67 to move upward as shown in FIG. 4. This position is defined as its holding position.

It is noted that the pivot pin 74 is located closer to the forward end of the kicker arm 69 than to its rearward end 70a. Thus, in the release position of the spacer means, the weight at the rear end of the kicker arm causes its rear end 70a to move downward against the top of the spacer arm 61 to position its forward end, hence tab 70 upward relative to the spacer arm 61. Moreover, in the release position of the spacer arm 61, the rear end of the stop arm 71 and hence roller 73 is located slightly below the rails in a nearly horizontal position whereby the stop arm 71 will be out of the path of the drums. The pivot pin 75 of the stop arm 71 is located slightly closer to its forward end 72 than to its roller end. When the spacer arm 61 moves toward its release position, the weight of the roller 73 causes the roller end of stop arm 71 to swing downward whereby stop arm 71 and roller 73 will be located out of the path of a drum when the spacer arm 61 has moved to its release position from its holding position.

The stop arm 71 has a stop 79 which rides under the bottom of the rail, as seen in FIGS. 3–6 and 9 such that when the rear end 67 of the spacer arm 61 moves upward, the stop 79 maintains the forward end 72 of the stop arm 71 down whereby the roller end will swing upward in the path of a drum, as illustrated in FIG. 4. In this position, the roller 73 of the stop arm will engage and hold the next rearward drum to maintain its spaced from the forward drum located above and engaging the kicker arm. A stop 77 secured to the top of the stop arm 61 and stop 79 secured to its bottom prevent the stop arm from rotating any further clockwise than that shown in FIG. 4. In this respect, the stop 79 will engage the bottom of the rail if the stop arm is attempted to be rotated clockwise further than that shown in FIG. 4, while the stop 77 will engage the top of the stop arm 71 to prevent further clockwise rotation.

In the holding position, when a drum is located above and engages the kicker arm 69, the drum will engage and rest on the tab 70 which is located slightly forward of the pivot pin 73 whereby the rear end 70a of the kicker arm will be rotated clockwise in an upward position as illustrated in FIG. 4. In this position, the kicker arm in effect will urge the drum in a forward direction. The spacers have dimensions and are spaced apart such that when a spacer is in its holding position, it will hold the next rearward drum spaced from the drum on its kicker arm. In addition, the rearward drum will engage and force downward the kicker arm of the next rearward spacer and hence hold it in its holding position. As the stop assembly 47 is released and the forward drum on the rails is allowed to roll forward and be removed from the rack as illustrated in FIGS. 5 and 6, the forward spacer will again assume its release position whereby the stop arm 71 will move down and out of the path of the next drum. Hence the next drum will be allowed to roll over the roller 73 and engage the kicker arm 69 to move the kicker arm and hence the forward spacer arm again to its holding position. The drum now in the forward position next to the unloading end will be held by the stop assembly 47 which has returned to its holding position. In the process of moving forward to the unloading end, as this drum moves off of the kicker arm of the next rearward spacer, this spacer will assume its release position to allow the drum being held by its stop arm to move forward over this spacer until it engages its kicker arm (moving this arm to the holding position) and is stopped by the stop arm of the forward spacer. Each of the other spacers, going in the rearward direction, sequentially will operate in the same manner to allow the drums sequentially to move forward without engagement between the drums.

Thus, when the forward drum at the unloading end is held in place by the stop assembly 47, all of the drums on the rail will be held spaced apart by the spacers. When the forward drum is allowed to roll forward off of the rails, all of the drums, starting with the next drum, will be allowed to roll forward sequentially until each drum engages the next forward kicker arm to cause its spacer arm to assume the holding position and to raise its stop arm upward in the path of the next rearward drum, the forward most drum being held by the stop assembly 47. Hence each drum may be removed from the rail without engaging an adjacent drum and as it is removed, the other drums will be allowed to sequentially roll forward a short distance without engaging an adjacent drum thereby eliminating the problems of frictional forces between the drums previously experienced by prior gravity feed drum racks.

Referring also to FIG. 7, there now will be described in detail the stop assembly 47 and the engaging assembly 49 for holding the forward drum on the rails and for allowing the forward drum to be fed or rolled off of the rail onto the carriage. A top assembly 47 and an engaging assembly 49 is provided for each level of rails except for the bottom rails 23a and 23b. The stop assembly for a given pair of rails comprises a pair of wheels 81 rotatably coupled to a rod 83 which extends through arms 85. The arms 85 in turn are fixed to a rod 87 which is supported for pivotal movement in bearings 89 connected to an upper cross bar at the unloading end of the rack. Normally, the arms 85 and the wheels 81 will be located in a position shown in FIGS. 3 and 4 to stop further movement of the forward drum off of the rails. In this position, the wheels 81 will engage the top forward portion of the forward drum holding it in place.

The engaging or release mechanism 49 for releasing the forward drum on a given upper pair of rails to allow it to roll forward and off of the rails comprises an arm 91 pivotally coupled to an arm 93 which in turn is fixed to the rod 87. The pivotal connection between arms 91 and 93 is illustrated at 95 in FIG. 7. Coupled to each of the upper pair of rails at the forward end for sliding movement is a T-shaped member identified at 101 in FIG. 8 and also shown in FIG. 7 and in FIG. 1. Each T-shaped member comprises a cross member 103 having a bar 105 connected to its midpoint. The member 103 is L-shaped in cross section and is formed by a horizontal member 103a and a vertical member 103b. Slots 105 are formed in the opposite ends of member 103b for receiving the inside horizontal base portions 43a of the rails as illustrated in FIG. 7 and in FIG. 9. The purpose of the slots 105 is to allow the T-shaped member to slide forward and rearward a short distance along the rails. The lower ends 103b' of the vertical member 103b extend or project outward beyond the ends of the horizontal member 103a whereby the lower end portions 103b' will project outward under the entire width of the horizontal base portions 43a of the rails. The extending end portions 103b' are located rearward of the stops 79 of the stop arms 71 of the forward spacers whereby when the stop arms 71 of the forward spacers rotate clockwise, as seen in FIG. 4, to move the rollers 73 upward, the stops 79 will engage the end portions 103b' and move the T-shaped member rearward. The forward end of the bar 105 of each T-shaped member is pivotally coupled to an arm 111 (See FIG. 1) which in turn is pivotally connected to the forward cross bar located between post 31a and 31b of the associated rails. In FIGS. 1 and 10, the pivotal connection between the bar 105 and the arm 111 for the second level of rails is identified at 113 while the pivotal connection between the arm 111 and the forward cross bar 25c is identified at 115. The other end of the arm 111 has a slot 117 formed therein, in which is slidably fitted one edge 91a of the engaging arm 91. (See FIG. 10.) The slot 117 is wide enough such that the arm 91 may move upward or downward therein.

Referring to FIGS. 3–7, connected to the bottom of the upper rails is a bar 121 which supports plates 123. Fitted between the plates 123 is a member 125, pivotally coupled to the plates 123 by pivot connection 126. Member 125 is formed by member 125a, 125b, and 125c fixedly connected together. A slot 127 is formed in the forward end of member 125a and an arm 129 is pivotally connected to the rearward end of member 125c by pivot connection 130. A roller 131 is connected to arm 129. The rod 83 is fitted in the slot 127 and may move in the slot as the arms 85 are rotated. The arm 129 and hence the roller 131 may pivot counterclockwise as illustrated in FIG. 4 such that when a drum rolls forward, the drum will rotate the arm 129 and roller 139 counterclockwise as seen in FIG. 4 and hence will move under and past the arm 129 until stopped by the wheel 81. A stop 133 is connected to the rear end of the arm 125 thereby limiting clockwise movement of the arm 129 as seen in FIG. 4.

When a drum engages the kicker arm of a forward spacer, its stop arm 71 will move up and will cause its associated T-shaped member to slide backward thereby pivoting the slotted end of its associated arm 111 outward to locate the engaging arm 91 in the path of upward travel of the carriage 37. This position is shown in FIG. 4. When there is no drum engaging the kicker arm of a forward spacer, the weight of the engaging arm 91 will cause its lower end to drop and move inward out of the path of the carriage 37 as illustrated in FIG. 3. When the lower end of the engaging arm 91 moves inward, the end of the arm 111 pivotally connected to the bar 105 of the T-shaped member will move forward thereby pulling the T-member forward.

Assume that a drum is located on the kicker arm of a forward spacer of a given level of rails and that the carriage moves upward to that level. Thus, the associated arm 91 of that level of rails will be located in the upward path of travel of the carriage. As the carriage engages the bottom of the arm 91 and moves upward, the arms 85 and its stop wheels 81 will be moved upward in the clockwise direction above its drum, as illustrated in FIGS. 5 and 6. In this position, the forward drum will be free to roll forward onto the carriage, which now is stopped by the arm 91, whereby it will be lowered down to the ground. In the cocked position, when the arm 91 is in the path of the carriage, the wheel 131 of arm 129 will be located against the top rearward portion of the drum thereby preventing it from moving rearward and at the same time, urging it forward. When the arms 85 and the wheels 81 are rotated upward in a clockwise direction, as shown in FIG. 5 and 6, the rod 83 will move within the slot 127 thereby pivoting the arm 125 in a counterclockwise direction, as shown in FIGS. 5 and 6 thus applying forward pressure by the wheel 31 against the top rearward portion of the forward drum and hence acting as a kicker to kick it forward onto the carriage. As the forward drum rolls onto the carriage, the weight of the drum will cause the carriage to move downward and out of the way of the lower portion of the arm 91 thereby allowing the arm 91 to drop down again to the position shown in FIG. 3. As the next drum moves on the kicker arm of the forward spacer, the linkage arrangement comprising the T-shaped member and the arm 111 will again cause the engaging arm 91 to move outward in the path of upward travel of the carriage ready for releasing the next drum when the carriage moves upward again. Thus, the carriage will move upward to a given set of rails to release its forward drum onto the carriage; move downward for feedout; and then upward again for removing the next drum. In this manner, the carriage will sequentially remove all of the drums from a given set of rails and after all of the drums are removed, the engaging arm 91 will assume a position next to the unloading end out of the way of the carriage whereby the carriage will move upward past this set of rails to the next level of rails to unload its drums. In this manner, the carriage will sequentially remove all of the drums from one set of rails and then move upward to the next set of rails to remove all of its drums. Although not shown in FIG. 1, a short pair of bars will extend rearward above the upper rails 29a and 29b to support an arm 125 above these rails at the unloading end.

As illustrated in FIG. 1, the carriage 37 comprises a bar 141 having two outward extending bars 143 and 145 connected thereto and adapted to ride in the chute 39 formed between posts 31a and 31b, 51a and 51b. The bar 131 has rollers 151 and 153 connected thereto which are adapted to ride in slots 155 and 157 formed in the forward end of posts 31a and 31b. Connected to the rollers and hence to the carriage are two cables 161 and 163 which extend over pulleys 165 and 167 around pulleys 169 and 171 and over a pulley system 173 to a weight 175 having narrow ends 176 adaped to ride in slots 177 formed on the inside surfaces of posts 51a and 51b. The weight of the weight member 175 is greater than that of the carriage 37 such that when a drum is not located on the carriage, the weight member 175 will pull the carriage upward. When a drum is located on the carriage, the weight of the drum plus that of the carriage is greater than that of the weight member 175 such that the drum will be lowered to the ground to the feedout tracks 181 and 183. Coupled to the pulley system is another pulley 185 around which is located a belt 187 coupled to a hydraulic system 189. The hydraulic system provides a braking action to slow the descent of the carriage and hence the descent of a drum as it is lowered to the ground. The braking system comprising the hydraulic system 189 has braking action only in one direction whereby it will not effect the operation of the weight 175 in pulling the carriage upward.

The feedout tracks 181 and 183 also are inclined downward toward the stop 184 at their forward end. The lengths of the tracks 181 and 183 are sufficient to hold two drums with one drum being located forward of the posts 191 and 193 and held by stop 184 and one drum being located within the chute formed between these posts and the vertical posts 31a and 31b. Thus, when the lower rails are fully loaded with drums, there will be two drums on the feedout tracks 181 and 183. The spacer arms of the lowest rails 23a and 23b are shifted slightly forward closer to the post 31a, 31b than the spacer arms of the upper rails. When two drums are located on the feedout tracks 181 and 183, and the lower rails are fully loaded with drums, the drum at the forward end of the lower rails will engage the drum on the tracks 181 and 183 in the chute and also will engage the kicker arm of the forward spacer to move the forward spacer to its holding position. All of the drums on the lower rails will be spaced from each other by the spacers. As the drums on the feedout tracks are sequentially removed, the other drums on the lower rails then will be allowed to roll sequentially forward with the next drum rolling into the chute. When the lower rails are full of drums, as well as the feedout tracks 181 and 183, the carriage 37 will be located on the tracks 181 and 183 but will not interfere with forward movement of the drums since they will merely roll over the carriage for removal. Although not shown, a catch arrrangement is provided to hold the carriage 37 at its feedout position on the tracks 181 and 183 thereby preventing it from moving upward until the catch is released. When all of the drums from the lower rails have been removed, the catch will be released and the carriage 37 then will be allowed to move upward to the next level of rails for removal of drums therefrom.

In one embodiment, the weight of the weight means 175 is about 40 pounds, while the weight of the carriage 37 is about 25 pounds.

In a further embodiment, the lower rails may be elevated and employ its own stop assembly 47 and engaging assembly 49 as the other rails whereby the carriage 37 will sequentially move up to lower rails and back down to the feedout tracks for sequential removal of its drums as it does with respect to the other rails. Although the embodiment disclosed was constructed to handle empty drums, it is to be understood that it could be strengthened to handle full drums.

We claim:

1. A drum feed rack comprising:

a plurality of pairs of spaced rails, each pair of rails being located at a different level and inclined downward toward an unloading end for supporting and storing a plurality of cylindrical drums on their sides and for allowing the drums to roll on said rails, a plurality of spaced spacer means coupled along the length of each rail forming a plurality of pairs of spacer means for each pair of rails for holding the drums spaced from each other and for allowing the drums sequentially and separately to roll forward on said rails toward said unloading end when the first drum on each pair of rails next to said unloading end is removed, movable stop means for each of a number of pairs of upper rails, each movable stop means being located at said unloading end of said rack for holding the first drum of each of said upper rails next to said unloading end and for releasing the first drum to allow it to roll off of the rails, a carriage for unloading drums from said rails and adapted to move vertically from a feedout position upward and downward next to said unloading end of said rack whereby said carriage may be located next to each of said upper rails for removing the drums therefrom, cable means or the like connected to said carriage and extending over reel means to a weight means having a weight greater than that of said carriage such that said weight means will pull said carriage upward when a drum is not located thereon, the combined weight of said carriage and a drum when located on said carriage being greater than that of said weight means whereby said carriage, when carrying a drum will be lowered downward to said feedout position, a movable engaging means for each of said upper rails and which is coupled to its associated movable stop means, each engaging means being adapted to extend in the path of travel of said carriage, as it moves upward, when a drum is on its associated rails next to the unloading end of said rack, each engaging means being adapted to release its stop means and to stop the upward travel of said carriage when extending in the path of travel of said carriage and engaged by said carriage as it moves upward to release the first drum on its associated rails to allow it to roll onto said carriage for transportation down to said feedout position.

2. The drum rack of claim 1 wherein:

each spacer means is pivotally coupled to a side of a rail for pivotal movement about a pivot axis between a holding position and a release position, each spacer means has a first end located forward of its pivot axis closer to said unloading end of said rack and a second end located rearward of its pivot axis, in the release position, each spacer means is adapted to have its first end located above the top of the rail and its second end at a position to allow a drum to roll over its second end to engage and move its first end downward to locate the spacer means in its holding position, in the holding position, each spacer means is adapted to have means at its second end in the path of the next drum for spacing the next drum from the drum above its first end.

3. The drum rack of claim 2 comprising:

linkage means for each of said upper rails and which is coupled to its engaging means, each linkage means being located to be actuated by the forward spacer means of its rails next to said unloading end, such that said forward spacer means of said upper rails will actuate its linkage means and locate its engaging means in the path of travel of said carriage when a drum is located on its rails next to said unloading end of said rack and moves its forward spacer means to its holding position.

* * * * *